United States Patent
Bayang et al.

(10) Patent No.: US 7,986,482 B2
(45) Date of Patent: Jul. 26, 2011

(54) APPLYING WHIP EFFECT TO MAGNETIC TAPE EXHIBITING A TAPE STICK CONDITION

(75) Inventors: Josephine Faith Bayang, Tucson, AZ (US); Ernest Stewart Gale, Tucson, AZ (US); Eiji Ogura, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 642 days.

(21) Appl. No.: 12/133,253

(22) Filed: Jun. 4, 2008

(65) Prior Publication Data

US 2009/0302143 A1 Dec. 10, 2009

(51) Int. Cl.
*G11B 15/18* (2006.01)
*B65H 59/00* (2006.01)

(52) U.S. Cl. .............................. 360/71; 360/90; 242/334

(58) Field of Classification Search .............. 360/69–75, 360/81–96.61; 242/324–358.1
See application file for complete search history.

(56) References Cited

U.S. PATENT DOCUMENTS 4,523,133 A * 6/1985 Messenger ........................ 318/7
5,367,471 A * 11/1994 Nguyen et al. ............... 360/74.3
* cited by examiner

*Primary Examiner* — Allen J Heinz
(74) *Attorney, Agent, or Firm* — John H. Holcombe

(57) ABSTRACT

As the result of a tape stick condition of magnetic tape with respect to a tape head, the supply reel and the take-up reel apply a base tension to the magnetic tape therebetween of substantially less than a full tension that occurs when the tape is running, and one reel varies the applied tension greater than and less than the base tension by an amount less than the base tension. The variation of the applied tension comprises first applying the greater tension and in succession, second, applying the less tension, comprising a whip effect. The whip effect may be in accordance with a sine wave. The varied tension is less than the base tension to maintain positive tension.

25 Claims, 4 Drawing Sheets

APPLYING WHIP EFFECT TO MAGNETIC TAPE EXHIBITING A TAPE STICK CONDITION

DOCUMENT INCORPORATED BY REFERENCE

Commonly assigned U.S. patent application Ser. No. 11/619,101, now U.S. Pat. No. 7,391,585, is incorporated for its showing of a method for reducing occurrences of tape stick conditions in magnetic tape.

FIELD OF THE INVENTION

This invention relates to magnetic tape extending between a supply reel and a take-up reel and crossing a tape head, for example in a magnetic tape drive, and more particularly to magnetic tape exhibiting a tape stick condition with respect to the tape head.

BACKGROUND OF THE INVENTION

Magnetic tape is a well-known removable storage medium for storing customer data. Magnetic tape drives are provided to read and write data with respect to the removable magnetic tape. It is considered advantageous to have increased data storage capacity with respect to a removable magnetic tape, for example, by providing thinner and longer magnetic tape. Magnetic tape tends to be relatively smooth, as do the magnetic tape heads for reading and writing data with respect to the magnetic tape. Thinner magnetic tape may also be smoother. An effect of smoother magnetic tape is that under some conditions the magnetic tape tends to stick to the tape head when the magnetic tape is stopped in the tape path. The tape is stopped, for example, during a wait time between commands to move the tape. A tape stick condition occurs when the air is squeezed out from between the magnetic tape and the tape head, a well-known effect of smooth to smooth surfaces, tending to hold the tape to the tape head.

SUMMARY OF THE INVENTION

Methods and magnetic tape drives are provided which may overcome a tape stick condition of magnetic tape with respect to a tape head. The magnetic tape extends between a supply reel and a take-up reel and crosses the tape head. The supply reel and the take-up reel generate a full tension to the magnetic tape therebetween while the magnetic tape is running from the supply reel to the take-up reel.

A tape stick condition may occur when the magnetic tape is stopped, and, in one embodiment, if a tape stick condition is detected, a method comprises the steps of:

operating the supply reel and the take-up reel to apply a base tension to the magnetic tape therebetween of substantially less than the full tension; and operating one of the reels to vary the applied tension greater than and less than the base tension by an amount less than the base tension, such that positive tension is continuously applied to the magnetic tape by both reels.

In a further embodiment, the step of varying the applied tension by one of the reels comprises first applying the greater tension and in succession, second, applying the less tension, comprising a whip effect.

In a still further embodiment, the base tension comprises substantially ¼ the full tension; and the step of varying the applied tension comprises applying the greater tension and the less tension in accordance with a sine wave.

In another embodiment, an additional step comprises operating the supply reel and the take-up reel to apply the base tension and to attempt to move the magnetic tape with an initial small force, gradually increasing the force at one reel while reducing the tension force at the other reel, and detecting whether the tape stick condition is overcome.

In a further embodiment, subsequent to the step of varying the applied tension, applying the step of attempting to move the magnetic tape, and, if the detection indicates the tape stick condition is not overcome, repeating the steps of applying the base tension, of varying the applied tension, and of attempting to move the magnetic tape.

In another embodiment, additionally, when the magnetic tape is stopped, the method initially attempts to move the magnetic tape in the forward direction, and detects absence of movement of the magnetic tape in the forward direction as a tape stick condition.

In still another embodiment, as the result of detection of tape stick, the method comprises operating the supply reel and the take-up reel to apply a base tension to the magnetic tape therebetween of substantially less than the full tension; moving at least one of the tape head and the magnetic tape in a y-direction with respect to each other, the y-direction substantially transverse to the longitudinal direction of the magnetic tape; and operating one of the reels to vary the applied tension greater than and less than the base tension by an amount less than the base tension, such that positive tension is continuously applied to the magnetic tape by the reels.

In other embodiments, a magnetic tape drive comprises a tape head; a supply reel and drive motor; a take-up reel and drive motor, the supply reel and the take-up reel configured to support a magnetic tape crossing the tape head; and a drive control system configured to operate the drive motors to move a magnetic tape between the supply reel and the take-up reel and generate a full tension to the magnetic tape while the magnetic tape is running therebetween, and as the result of detection of a tape stick condition of magnetic tape with respect to the tape head occurring when the magnetic tape is stopped: to operate the drive motors to cause the supply reel and the take-up reel to apply a base tension to the magnetic tape therebetween of substantially less than the full tension; and to operate one of the reel drive motors to vary the applied tension greater than and less than the base tension by an amount less than the base tension, such that positive tension is continuously applied to the magnetic tape by the reels.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements.

While this invention is described in terms of the best mode for achieving this invention's objectives, it will be appreciated by those skilled in the art that variations may be accomplished in view of these teachings without deviating from the spirit or scope of the invention.

Figure 1:
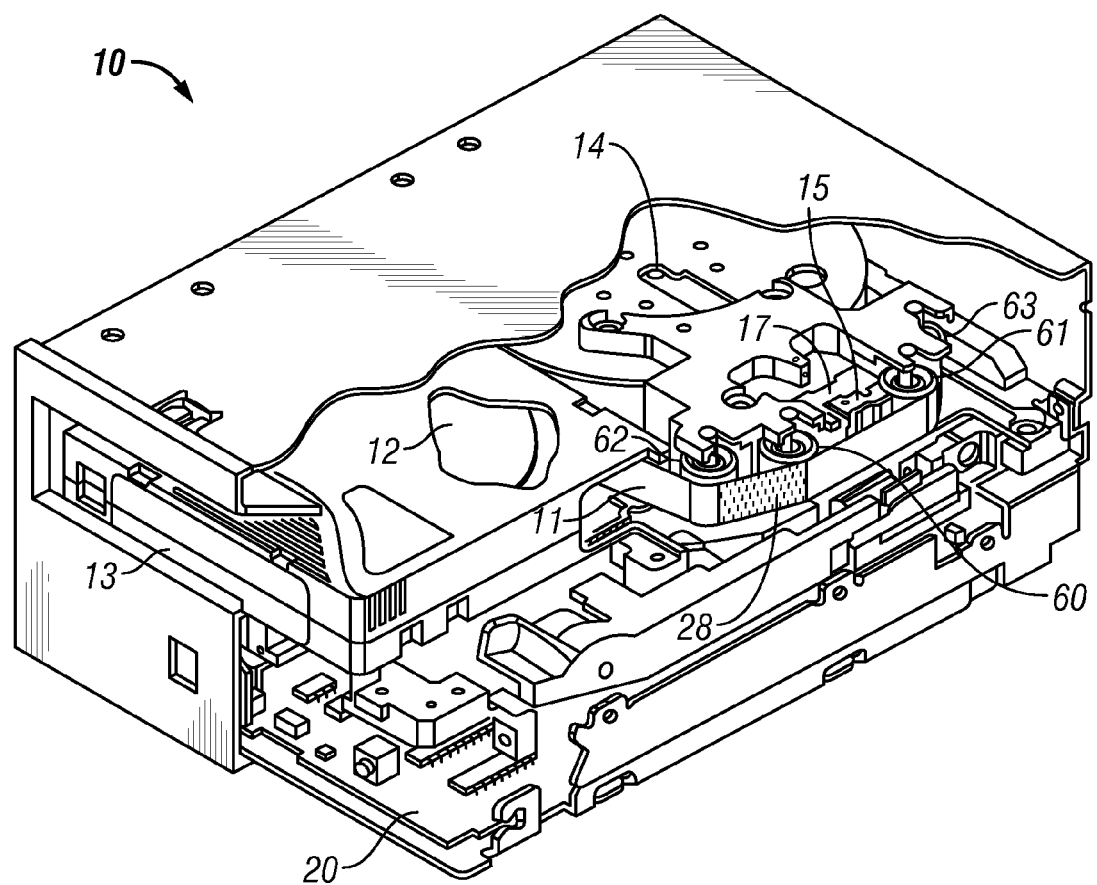
FIG. 1 is a partially cut away view of a magnetic tape drive which may implement the present invention.
Figure 2:
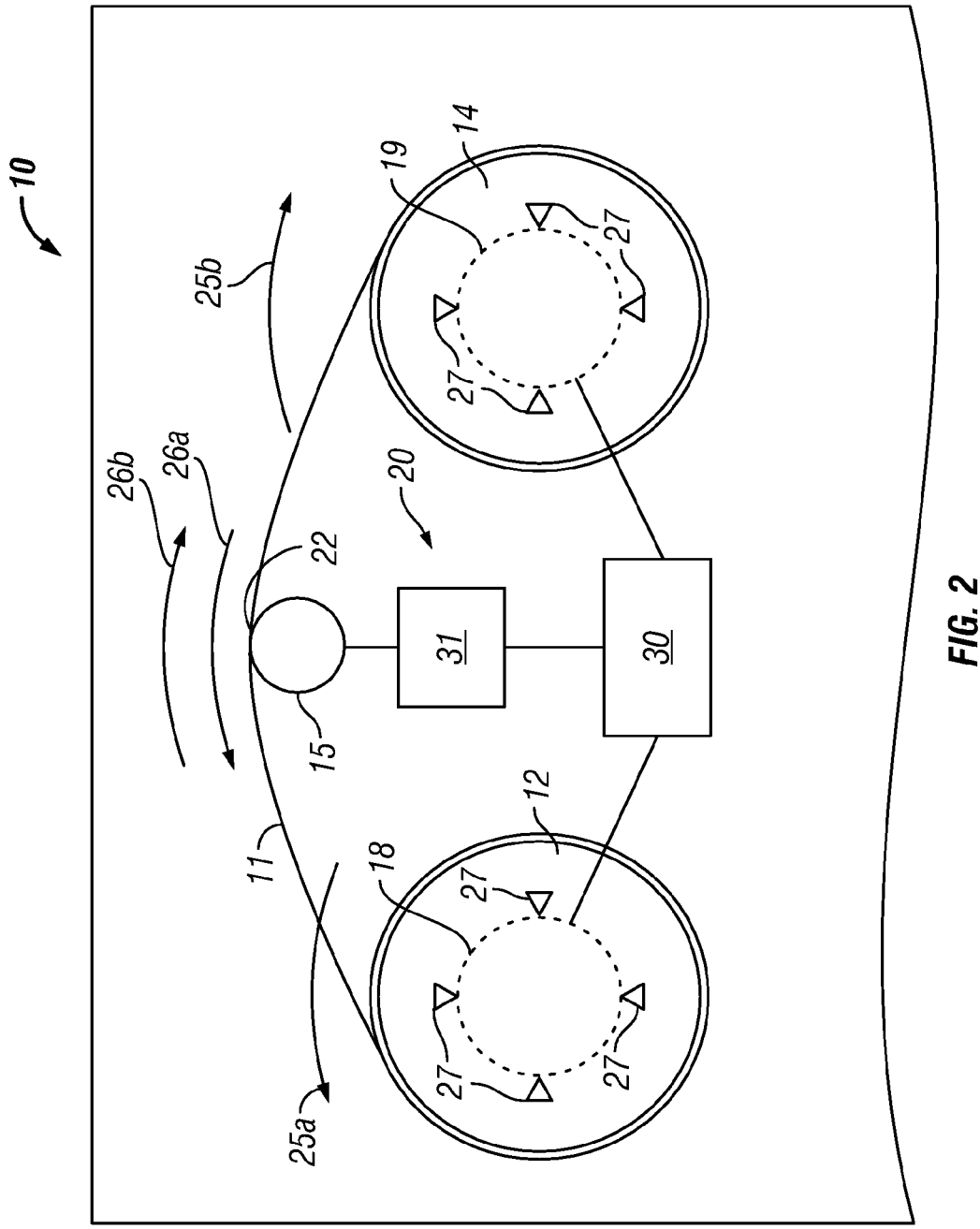
FIG. 2 is a block diagram of the magnetic tape drive of FIG. 1.

FIGS. 1 and 2 illustrate a reel to reel magnetic tape drive 10 which writes data to and reads data from magnetic tape 11. The illustrated magnetic tape drive moves the magnetic tape 11 along a tape path between a bi-directional reel 12 in a tape cartridge 13 and another bi-directional reel 14. The reels are rotated by torque supplied by drive motors 18 and 19, respectively. Magnetic tape drives may take any of various forms, as may the tape cartridge. A single reel magnetic tape cartridge 13 and associated magnetic tape drive are illustrated. Alternatively, the reels 12 and 14 may comprise reels of a dual reel magnetic tape cartridge. An example of the magnetic tape drive 10 is the IBM® LTO (Linear Tape Open) magnetic tape drive.

The reels, when rotated, move the magnetic tape in either direction, such that either reel may comprise a take-up reel and the other a supply reel at any one time. A portion 22 of the magnetic tape 11 extends between the reels, crossing a magnetic tape head 15. The portion 22 may comprise any portion of the total length of the magnetic tape 11 as the magnetic tape is moved in the longitudinal direction 26a or 26b from the supply reel to the take-up reel.

The tape head is supported and moved transversely with respect to the longitudinal direction 26a or 26b of the magnetic tape by an actuator 17. Roller tape guides 60, 61, 62 and 63 hold the magnetic tape in position laterally, and may move the magnetic tape transversely to the longitudinal direction 26a or 26b.

The drive motors 18 and 19 are operated by a drive control system 30 of tape drive controller 20 to move the magnetic tape longitudinally. The drive control system operates the drive motors 18 and 19 at various rotational speeds to insure that the tape leaves one reel at the same linear speed that it is wound onto the other reel. The drive control system also operates the drive motors to generate a full tension (represented by arrows 25a and 25b) to the magnetic tape while the magnetic tape is running between the reels. The speed of rotation of each reel may be determined by reading Hall sensors 27 at each of the drive motors 18 and 19. The Hall sensors may also be used to determine the tension generated to the magnetic tape, and to determine the longitudinal position of the magnetic tape by tracking the motion of the reels after the initial threading of the magnetic tape. The longitudinal position of the magnetic tape is an important aspect of determining the amount of tape on each reel, and therefore the torque required by the associated drive motor to generate the desired tension 25a and 25b at the reel.

The magnetic tape head 15 may comprise a plurality of read and write heads for respectively reading and writing data with respect to the magnetic tape 11, and may have one or more servo sensors for sensing servo tracks or bands 28 recorded on the magnetic tape. The servo sensor(s) may sense the lateral position of the magnetic tape with respect to the tape head. The read and write data and the servo signals are processed by the recording system 31 of tape drive controller 20. The servo signals are employed by a servo system of, for example, the drive control system 30 to operate actuator 17 to transversely position the tape head 15 to track follow the servo tracks or bands. The servo system may also detect the longitudinal position of the tape from the servo tracks or bands.

Referring to FIGS. 1, 2, 3 and 4, the drive control system 30 operates the drive motors to move the magnetic tape 11 at high speeds to access desired data, and move the magnetic tape at low speeds to read and write data. When a read, write or any other tape motion command is completed, the tape drive may stop the tape in step 50 and wait for the next command to be issued. When the magnetic tape is stopped, tape tension is typically reduced in step 52 after a certain period of time to preserve the tape, save power and reduce heat. This is a normal step referred to as "stoplock" mode. After waiting, in step 53, when a tape motion command is issued, the tape drive, e.g. drive control system 30, starts moving the tape by pulling the tape in one direction gradually in step 55 until, as detected in step 56, (a) the tape drive detects reel motion by Hall state sensor change or (b) if no Hall state sensor change, the tape drive stops increasing the force to pull the magnetic tape to prevent tape damage.

Attempting to move the magnetic tape, and detecting the absence of movement of the magnetic tape, indicates a tape stick condition. The graduated pull motion of step 55 comprises beginning with an initial small force in a desired forward or backward direction, gradually increasing the force at the reel that is the take-up reel in the desired direction by increasing the current to the take-up reel motor, while reducing the tension force at the supply reel by decreasing the current to the supply reel motor gradually, in open loop, to break the balance of the two reels. Once the Hall sensor state change is detected, which means that the tape stick condition has been overcome, the tape drive goes back to closed loop operation in step 58 and starts acceleration. If the pulling force reaches a prescribed limit, for example without a Hall sensor state change, a tape stick condition is indicated.

A retry limit may be applied to the number of attempts at stiction recovery in step 64. If the limit has been met, an error condition is indicated in step 65 and all tension of the magnetic tape is dropped.

Figure 4:
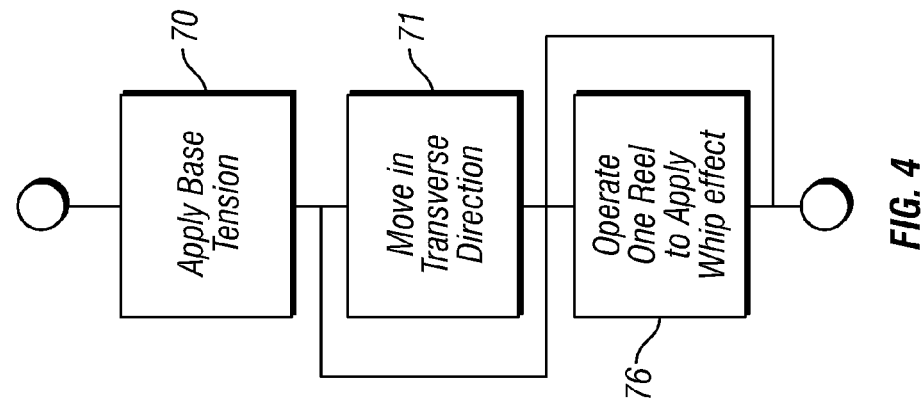
FIGS. 3 and 4 are flow charts depicting an operation of the magnetic tape drive of FIGS. 1 and 2.
Figure 3:
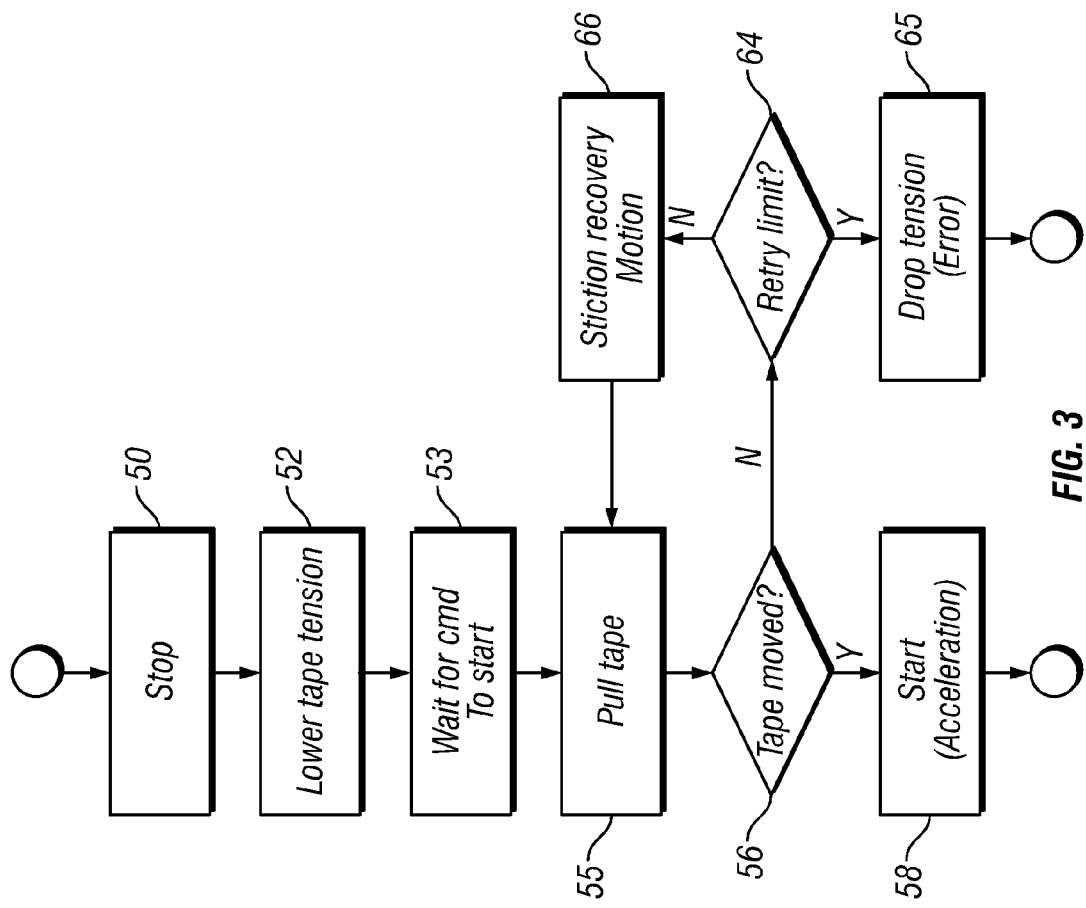

If the limit has not been met, the stiction recovery motion of FIG. 4 is initiated in step 66.

In one embodiment, as the result of detection of a tape stick condition in step 56, the method of step 66 comprises, in step 70, operating the supply reel and the take-up reel 12 and 14 to apply a base tension to the magnetic tape therebetween 22 of substantially less than the full tension.

In one embodiment, the base tension of step 70 comprises substantially ¼ the full tension between the take-up and supply reels. The full tension (represented by arrows 25a and 25b) is the tension applied by the reels to the magnetic tape while the magnetic tape is running between the reels. The ¼ tension may be defined in terms of setting the currents for the drive motors 18 and 19 to a value that causes the ¼ tension. In another embodiment, the ¼ tension is achieved by setting a digital to analog converter (DAC) value of the motors 18 and 19 to a value that causes the ¼ tension.

In step 71, the drive, for example drive control system 30, moves at least one of the tape head and the magnetic tape in a y-direction with respect to each other, the y-direction substantially transverse to the longitudinal direction 26a or 26b of the magnetic tape. In the instant example, the drive operates actuator 17 to move the tape head 15 in a y-direction substantially transverse to the longitudinal direction of the magnetic tape 11. This may be called a "head shake". The actuator 17 may comprise a linear motion device, for example, a voice coil motor (VCM) that moves the tape head 15 in one direction if a positive current is applied and in the opposite direction if a negative current is applied.

Alternatively, the drive may operate one or more of the roller tape guides 60, 61, 62 and 63 to move the magnetic tape 11 at portion 22 in the y-direction substantially transverse to the longitudinal direction 26a or 26b of the magnetic tape.

In one embodiment, the movement in the y-direction of step 71 is rapid and may physically separate the portion 22 of the tape from the tape head 15.

In step 76, the drive, for example, drive control system 30, operates one of the supply reel and the take-up reel to vary the applied tension greater than and less than the base tension by an amount less than the base tension, such that positive tension is continuously applied to the magnetic tape by both reels.

In one embodiment, step 76 of varying the applied tension by one of the reels comprises first applying greater tension and in succession, second, applying less tension, comprising a whip effect.

Figure 5:
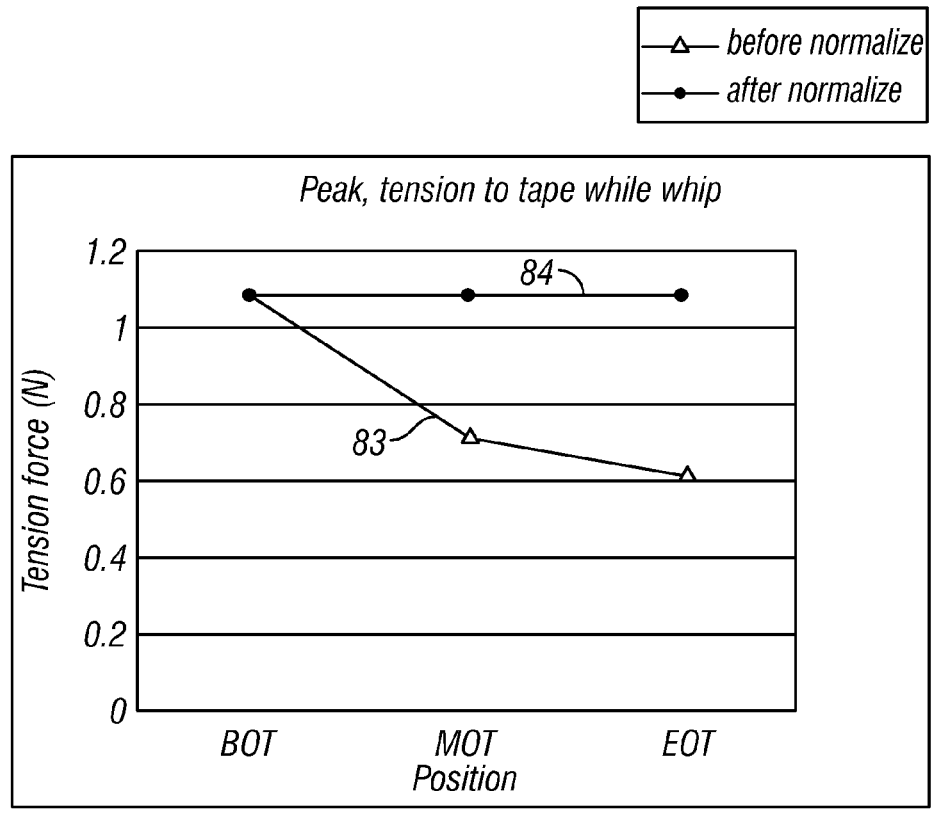
FIG. 5 is a graphical illustration of the normalization of the tension force employed in the operation of FIG. 4.
Figure 6:
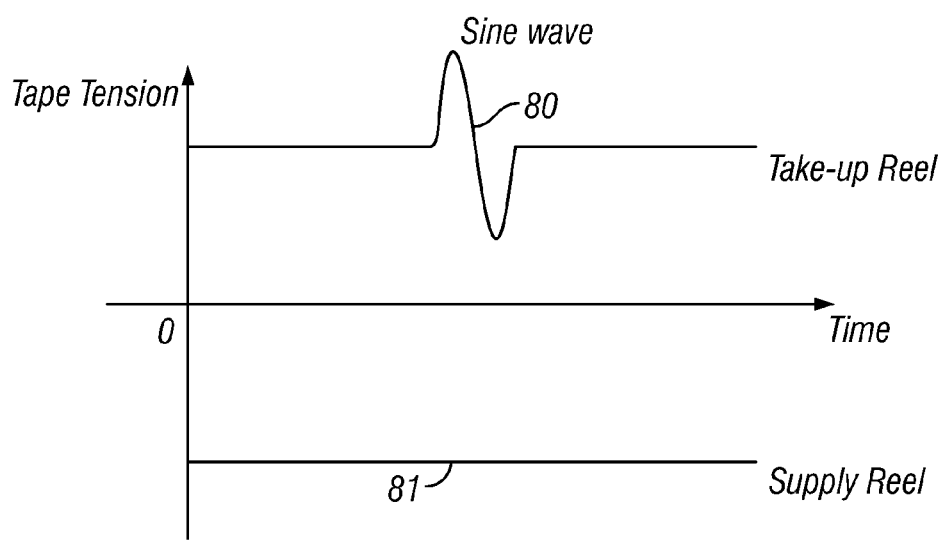
FIG. 6 is a graphical illustration of the whip tensions employed in the operation of FIG. 4.

Referring to FIGS. 4, 5 and 6, in a still further embodiment, the step 76 of varying the applied tension to one of the take-up and supply reels comprises applying the greater tension and the less tension in accordance with a sine wave 80, and the ¼ tension of the other reel is illustrated as constant current 81. The whip effect is illustrated in FIG. 6 as conducted by the take-up reel while the supply reel maintains the base tension. The reels may alternatively be operated in the reverse direction, or, when operating in the reverse direction, the naming of the reels may be reversed.

The equations for the currents for both reel motors in terms of applied current:

$$DAC\_supply = \tfrac{1}{4} * tension\_current;$$

$$DAC\_takeup = \tfrac{1}{4} * tension\_current + a * \sin(w*t) * N;$$

Where: a is amplitude, w is frequency, and t is time, N is the normalization factor, and N is given as (radius/full radius).

FIG. 5 shows peak tension forces without ("before") 83 and with ("after") 84 normalization by tape position at the take-up reel. "Tension_current" is thus a function of the radius at which the magnetic tape begins to wind onto the take-up reel. If the radius is larger, more current is required. In the same way, the whip effect is normalized by radius to give the same force to the magnetic tape no matter what the position of the magnetic tape. Without normalization, curve 83 shows that the drive provides less force to the reel at EOT (End of Tape) and at MOT (Middle of Tape) than after normalization to account for the small or less than full radius of the tape on the reel. At BOT (Beginning of Tape), no normalization is required due to the fact that the tape is fully positioned on the take-up reel. The normalization may be calculated in steps as illustrated by curve 83, or may be a continuous function.

As discussed above, the Hall sensors and/or the servo information may be used to determine the longitudinal position of the magnetic tape, and thereby determine the position of the magnetic tape on the take-up reel and, hence, the radius of the take-up reel for normalization.

Referring to FIGS. 3, 4, 5 and 6, the whip effect of step 76 comprises pulling and releasing the magnetic tape quickly, in a small sinusoidal tape motion. The motion is likely to whip the magnetic tape off of the tape head.

After conducting step 66, the drive, e.g. drive control system 30, again conducts step 55 by pulling the tape in one direction gradually until, as detected in step 56, (a) the tape drive detects reel motion by Hall state sensor change or (b) if no Hall state sensor change, the tape drive stops increasing the force to pull the magnetic tape to prevent tape damage, an indication that the tape stick condition remains. If the tape stick condition has not been overcome in step 56 and the retry limit of step 64 is not met, step 66 to recover from the tape stick condition is conducted again.

Step 71 may be conducted prior or subsequent to step 76 or may be conducted in reverse order sequentially or may be conducted alternatively in succeeding retries of step 66.

Thus, step 55 to pull the tape, step 70 to tension the tape at the base tension, step 71 to provide the head shake, and step 76 to whip the tape, are conducted repeatedly until the tape stick condition is overcome or the retry limit of step 64 is met.

Referring to FIGS. 1 and 2, the drive controller 20 can take the form of an entirely hardware embodiment or an embodiment containing both hardware and software elements. In a preferred embodiment, the methods performed by elements of the drive controller are implemented in software, which includes but is not limited to resident software, microcode, firmware, etc.

Furthermore, the implementation of the methods can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, and random access memory (RAM), a read-only memory (ROM), a rigid magnetic disk and an optical disk. Current examples of optical disks include compact disk-read only memory (CD-ROM), compact disk-read/write (CD-R/W) and DVD.

The drive controller 20 may comprise a data processing system suitable for storing and/or executing program code and will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Those of skill in the art will understand that changes may be made with respect to the methods discussed above, including changes to the ordering of the steps. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A method of overcoming a detected tape stick condition of magnetic tape with respect to a tape head, said magnetic tape extending between a supply reel and a take-up reel and crossing said tape head, said supply reel and said take-up reel generating a full tension to said magnetic tape therebetween while said magnetic tape is running from said supply reel to said take-up reel, said tape stick condition occurring when said magnetic tape is stopped, comprising the steps of:

operating said supply reel and said take-up reel to apply a base tension to said magnetic tape therebetween of substantially less than said full tension; and operating one of said take-up reel and said supply reel to vary in a whip effect said applied tension greater than and less than said base tension by an amount less than said base tension, such that positive tension is continuously applied to said magnetic tape by both said take-up reel and said supply reel.

2. The method of claim 1, wherein said step of varying said applied tension by said one reel comprises first applying said greater tension and in succession, second, applying said less tension, comprising a whip effect.

3. The method of claim 2, wherein:
said base tension comprises substantially ¼ said full tension; and
said step of varying said applied tension comprises applying said greater tension and said less tension in accordance with a sine wave.

4. The method of claim 3, additionally comprising the step of operating said supply reel and said take-up reel to apply said base tension and to attempt to move said magnetic tape with an initial small force, gradually increasing said force at one said reel while reducing the tension force at the other said reel, and detecting whether said tape stick is overcome.

5. The method of claim 4, subsequent to said step of varying said applied tension, applying said step of attempting to move said magnetic tape, and, if said detection indicates said tape stick is not overcome, repeating said steps of applying said base tension, of varying said applied tension, and of attempting to move said magnetic tape.

6. A magnetic tape drive comprising:
a tape head;
a supply reel and drive motor;
a take-up reel and drive motor, said supply reel and said take-up reel configured to support a magnetic tape crossing said tape head; and
a drive control system configured:
to operate said drive motors to move a magnetic tape between said supply reel and said take-up reel and generate a full tension to said magnetic tape while said magnetic tape is running therebetween, and
as the result of detection of a tape stick condition of magnetic tape with respect to said tape head occurring when said magnetic tape is stopped:
to operate said drive motors to cause said supply reel and said take-up reel to apply a base tension to said magnetic tape therebetween of substantially less than said full tension; and
to operate one of said take-up reel drive motor and said supply reel drive motor to vary said applied tension greater than and less than said base tension by an amount less than said base tension, such that positive tension is continuously applied to said magnetic tape by both said take-up reel and said supply reel.

7. The magnetic tape drive of claim 6, wherein said drive control system is configured, in said step of varying said applied tension by said one reel drive motor, to operate said one reel drive motor to first apply said greater tension and in succession, second, apply said less tension, comprising a whip effect.

8. The magnetic tape drive of claim 7, wherein:
said base tension comprises substantially ¼ said full tension; and
said drive control system is configured, in said step of varying said applied tension by said one reel, to operate said one reel drive motor to apply said greater tension and said less tension in accordance with a sine wave.

9. The magnetic tape drive of claim 8, wherein said drive control system is configured to operate said supply reel and said take-up reel to apply said base tension and to attempt to move said magnetic tape with an initial small force, gradually increasing said force at one said reel while reducing the tension force at the other said reel, and detecting whether said tape stick is overcome.

10. The magnetic tape drive of claim 9, wherein said drive control system is configured to, subsequent to varying said applied tension, apply said step of attempting to move said magnetic tape, and, if said detection indicates said tape stick is not overcome, to repeat said steps of applying said base tension, of varying said applied tension, and of attempting to move said magnetic tape.

11. A method of overcoming a tape stick condition of magnetic tape with respect to a tape head, said magnetic tape extending between a supply reel and a take-up reel and crossing said tape head, said supply reel and said take-up reel generating a full tension to said magnetic tape therebetween while said magnetic tape is running from said supply reel to said take-up reel, comprising the steps of:
when said magnetic tape is stopped, attempting to move said magnetic tape in the forward direction, and detecting absence of movement of said magnetic tape in said forward direction as a tape stick condition;
operating said supply reel and said take-up reel to apply a base tension to said magnetic tape therebetween of substantially less than said full tension; and
operating one of said take-up reel and said supply reel to vary said applied tension greater than and less than said base tension by an amount less than said base tension, such that positive tension is continuously applied to said magnetic tape by both said take-up reel and said supply reel.

12. The method of claim 11, wherein said step of varying said applied tension by said one reel comprises first applying said greater tension and in succession, second, applying said less tension, comprising a whip effect.

13. The method of claim 12, wherein:
said base tension comprises substantially ¼ said full tension; and
said step of varying said applied tension comprises applying said greater tension and said less tension in accordance with a sine wave.

14. The method of claim 13, additionally comprising the step of operating said supply reel and said take-up reel to apply said base tension and to attempt to move said magnetic tape with an initial small force, gradually increasing said force at one said reel while reducing the tension force at the other said reel, and detecting whether said tape stick is overcome.

15. The method of claim 14, subsequent to said step of varying said applied tension, applying said step of attempting to move said magnetic tape, and, if said detecting step indicates said tape stick is not overcome, repeating said steps of applying said base tension, of varying said applied tension, and of attempting to move said magnetic tape.

16. A magnetic tape drive comprising:
a tape head;
a supply reel and drive motor;
a take-up reel and drive motor, said supply reel and said take-up reel configured to support a magnetic tape crossing said tape head; and
a drive control system configured:
to operate said drive motors to move a magnetic tape between said supply reel and said take-up reel and generate a full tension to said magnetic tape while said magnetic tape is running therebetween, and when said magnetic tape is stopped, to operate said drive motors to attempt to move said magnetic tape, detecting absence of movement of said magnetic tape as a tape stick condition;

as the result of detection of a tape stick condition of magnetic tape with respect to said tape head occurring when said magnetic tape is stopped:

to operate said drive motors to cause said supply reel and said take-up reel to apply a base tension to said magnetic tape therebetween of substantially less than said full tension; and to operate one of said take-up reel drive motor and said supply reel drive motor to vary said applied tension greater than and less than said base tension by an amount less than said base tension, such that positive tension is continuously applied to said magnetic tape by both said take-up reel and said supply reel.

17. The magnetic tape drive of claim 16, wherein said drive control system is configured, in said step of varying said applied tension by said one reel, to operate said one reel drive motor to first apply said greater tension and in succession, second, apply said less tension, comprising a whip effect.

18. The magnetic tape drive of claim 17, wherein:
said base tension comprises substantially ¼ said full tension; and
said drive control system is configured, in said step of varying said applied tension by said one reel, to operate said one reel drive motor to apply said greater tension and said less tension in accordance with a sine wave.

19. The magnetic tape drive of claim 18, wherein said drive control system is configured to operate said supply reel and said take-up reel to apply said base tension and to attempt to move said magnetic tape with an initial small force, gradually increasing said force at one said reel while reducing the tension force at the other said reel, and detecting whether said tape stick is overcome.

20. The magnetic tape drive of claim 19, wherein said drive control system is configured to, subsequent to varying said applied tension, apply said step of attempting to move said magnetic tape, and, if said detection indicates said tape stick is not overcome, to repeat said steps of applying said base tension, of varying said applied tension, and of attempting to move said magnetic tape.

21. A method of overcoming a detected tape stick condition of magnetic tape with respect to a tape head, said magnetic tape extending between a supply reel and a take-up reel and crossing said tape head in a longitudinal direction of said magnetic tape, said supply reel and said take-up reel generating a full tension to said magnetic tape therebetween while said magnetic tape is running in said longitudinal direction from said supply reel to said take-up reel, said tape stick condition occurring when said magnetic tape is stopped, comprising the steps of:

operating said supply reel and said take-up reel to apply a base tension to said magnetic tape therebetween of substantially less than said full tension;

moving at least one of said tape head and said magnetic tape in a y-direction with respect to each other, said y-direction substantially transverse to said longitudinal direction of said magnetic tape; and operating one of said take-up reel and said supply reel to vary said applied tension greater than and less than said base tension by an amount less than said base tension, such that positive tension is continuously applied to said magnetic tape by both said take-up reel and said supply reel.

22. The method of claim 21, wherein said step of varying said applied tension by said one reel comprises first applying said greater tension and in succession, second, applying said less tension, comprising a whip effect.

23. The method of claim 22, wherein:
said base tension comprises substantially ¼ said full tension; and
said step of varying said applied tension comprises applying said greater tension and said less tension in accordance with a sine wave.

24. The method of claim 23, additionally comprising the step of operating said supply reel and said take-up reel to apply said base tension and to attempt to move said magnetic tape with an initial small force, gradually increasing said force at one said reel while reducing the tension force at the other said reel, and detecting whether said tape stick is overcome.

25. The method of claim 24, subsequent to said step of varying said applied tension, applying said step of attempting to move said magnetic tape, and, if said detection indicates said tape stick is not overcome, repeating said steps of dropping said tension, of moving at least one of said tape head and said magnetic tape, of applying said base tension, of varying said applied tension, and of attempting to move said magnetic tape.

* * * * *